United States Patent [19]

Kreitzer

[11] Patent Number: 5,685,217
[45] Date of Patent: Nov. 11, 1997

[54] MEATBALL COOKING DEVICE

[76] Inventor: Rachel Kreitzer, 74 W. Union St., Canton, Pa. 17724

[21] Appl. No.: 643,842

[22] Filed: May 7, 1996

[51] Int. Cl.[6] .................. A47J 37/04; H05B 6/80
[52] U.S. Cl. .................. 99/419; 99/442; 99/446; 99/448; 99/DIG. 14; 219/725; 219/732
[58] Field of Search .................. 99/419–421 V, 99/442–444, 441, 445–448; 294/1.1, 168, 143, 158; 211/59.1, 181, 125; 219/523, 546, 720, 732, 725, 762, 733, 772; 426/107, 243; D7/359, 409

[56] References Cited

U.S. PATENT DOCUMENTS

| | | |
|---|---|---|
| 15,799 | 9/1856 | Bennett . |
| 119,974 | 10/1871 | Fitzhugh . |
| 366,679 | 7/1887 | North . |
| 1,339,625 | 5/1920 | Holloway .................. 99/419 |
| 1,565,077 | 12/1925 | Finn .................. 99/419 X |
| 1,630,188 | 5/1927 | Knauff .................. 99/419 |
| 1,969,601 | 8/1934 | Foch .................. 99/419 |
| 1,994,894 | 3/1935 | Marcotte .................. 99/419 |
| 2,007,260 | 7/1935 | Smith .................. 99/419 |
| 2,648,275 | 8/1953 | Thompson .................. 99/419 |
| 3,994,212 | 11/1976 | Wong .................. 99/444 |
| 4,366,750 | 1/1983 | Brown et al. .................. 99/421 |
| 4,427,706 | 1/1984 | El-Hag .................. 426/243 |
| 4,558,197 | 12/1985 | Wyatt .................. 99/DIG. 14 |
| 4,887,523 | 12/1989 | Murphy et al. .................. 99/419 |
| 4,896,011 | 1/1990 | Trucks .................. 426/243 |
| 4,924,768 | 5/1990 | Jay .................. 99/425 |
| 4,933,528 | 6/1990 | Barr .................. 219/10.55 E |
| 5,174,196 | 12/1992 | Cheatham .................. 99/419 |
| 5,193,443 | 3/1993 | Carney .................. 99/419 |

FOREIGN PATENT DOCUMENTS

| | | | |
|---|---|---|---|
| 544827 | 6/1956 | Italy .................. | 99/419 |

*Primary Examiner*—Timothy F. Simone
*Attorney, Agent, or Firm*—Brown, Pinnisi & Michaels

[57] ABSTRACT

A device for cooking meatballs, which may be made for use in a microwave oven, conventional oven or stove-top. The invention comprises a horizontal drip pan having a plurality of relatively short vertical pegs projecting upward from the bottom, spaced throughout the pan sufficiently apart to allow each meatball to be impaled on a peg without touching its neighbor meatball. Each peg has a disk-like stop for supporting a meatball, and preventing it from sliding down the peg into the bottom of the pan. The pan is preferably fabricated of microwave-oven safe material, but can also be made of metal and covered with Teflon® or a similar anti-stick coating for better cleaning in stove-top or regular oven use. The pan is preferably dishwasher safe for easier cleaning.

8 Claims, 1 Drawing Sheet

MEATBALL COOKING DEVICE

FIELD OF THE INVENTION

The invention pertains to the field of cooking accessories. More particularly, the invention pertains to accessories for cooking meatballs or the like.

BACKGROUND OF THE INVENTION

The prior art method of cooking meatballs involves frying them in a skillet, then draining the fat and putting the meatballs in with the spaghetti or sauce with which they are to be served. As the meatballs are effectively fried in their own fat, they absorb much of that fat rather than having it drain away during cooking. The result is meatballs which are relatively high in fat and cholesterol. Often the meatballs are merely browned, then the sauce is added to the pan, and the meatballs cook in the sauce. This is even worse, as all the fat from the meat is mixed with the sauce.

Meatballs and the like are hard to cook without frying them in their own fat, since they are made up of ground meat which has little coherence, compared with chunks of solid meat as might be cooked on a skewer such as shish-kabobs. If spitted vertically, the meatballs would tend slip down the spit and wind up back in the fat. If spitted horizontally, as is usually done with shishkabobs, they tend to fall apart and fall off the spit.

While I am aware of no prior art devices for cooking meatballs in a microwave oven, there have been a number of devices patented for cooking specific foods. A selection of these are:

Bennett, "Gridiron", U.S. Pat. No. 15,799, is a broiling pan having spikes to hold meat stationary, and to allow the meat to cook with the minimum of contact with the hot pan. The spikes are too short to use with meatballs, and would have the problems noted above.

Fitzhugh, "Improvement in Broilers", U.S. Pat. No. 119,974, is a vertical pan with retractable spits, which is placed in front of an open fire for toasting or roasting. The vertical arrangement would not work in microwaves, and the generally horizontal spits have the problems noted above.

North, "Broiler", U.S. Pat. No. 366,679, is a dome-shaped cooker with fins. The fins or lugs are too thick to go through a meatball, and the dome shape would result in the meatballs sliding off.

Wong, "Drain Pan for Microwave Oven" U.S. Pat. No. 3,994,212, is a drain pan with ribs rather than pegs.

Brown, "Rotary Skewer Cooker", U.S. Pat. No. 4,366,750, is a cooker with a relatively small number of tall skewers in a shield. It contains its own central heat source and could not be used in a microwave.

E-Hag, "Method for Heating Par-Fried, Batter-Coated Frozen Foods", U.S. Pat. No. 4,427,706, is a tray for conventional ovens which has vertical supports to hold battered fish or the like vertically. The bottom is contoured to increase heat transfer. There are no pegs or the like.

Murphy and Murphy, "Shish-Kabob Cooking Device", U.S. Pat. No. 4,887,523, is a circular base unit for supporting skewers for shish-kabobs. The vertical skewers provide no support for the food, as noted above. If used for cooking meatballs, the meatballs could be expected to fall down onto the bottom of the pan. The pan is contoured in concentric rings to allow fat to fall down below the food.

Jay, "Multi-Purpose Baking and Roasting Rack", U.S. Pat. No. 4,924,768, designed to support either a single large food item such as a roast or chicken, or a number of smaller items such as potatoes, on a wire rack having a number of tall thin spikes.

Barr, "Bacon Holder for Microwave Oven", U.S. Pat. No. 4,933,528, comprises a series of comb-like supports in which strips of bacon are placed, and then held in position by means of skewers passing through the combs and the bacon. The device is appropriate only for material which is in the form of strips, such as bacon, but could not be used for meatballs.

Carney, "Skewer for Barbecuing", U.S. Pat. No. 5,193,443, is a skewer having "wheels" which are slipped on the skewer. The wheels secure the meat and vegetables on the horizontal skewer and support the food above the cooking surface. The problem with using horizontal skewers for cooking meatballs is discussed above. No drip pan is shown.

Cheatham, "Ka-bob Preparation Device", U.S. Pat. No. 5,174,196, is a flat plate with countersunk holes to support shish-kabob skewers during assembly of the kabobs. It is not designed for use in cooking the kabobs, which would be done on the skewers individually after they are assembled on the device of the invention. The food rests on the plate at the lower end of the kabobs.

SUMMARY OF THE INVENTION

The invention presents a device for cooking meatballs, which may be made for use in a microwave oven, conventional oven or stove-top. The invention comprises a horizontal drip pan having a plurality of relatively short vertical pegs projecting upward from the bottom, spaced throughout the pan sufficiently apart to allow each meatball to be impaled on a peg without touching its neighbor meatball. Each peg has a disk-like stop for supporting a meatball, and preventing it from sliding down the peg into the bottom of the pan. The pan is preferably fabricated of microwave-oven safe material, but can also be made of metal and covered with Teflon® or a similar anti-stick coating for better cleaning in stove-top or regular oven use. The pan is preferably dishwasher safe for easier cleaning.

DESCRIPTION OF THE PREFERRED EMBODIMENT

Figure 1:
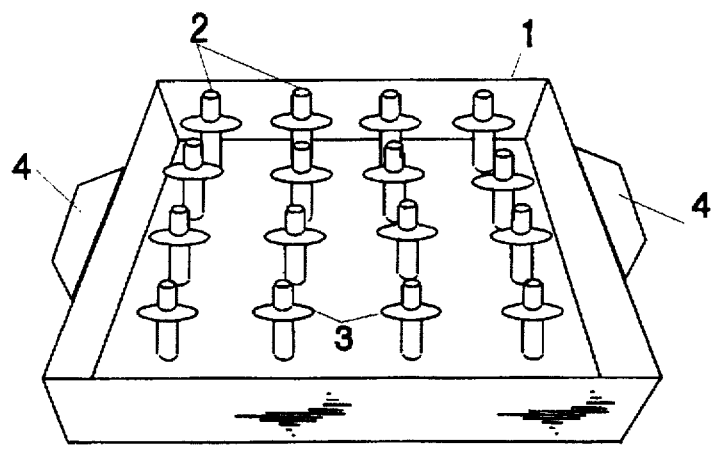
FIG. 1 shows the preferred microwave-safe embodiment of the invention.

FIG. 1 shows the preferred embodiment of the invention, as intended for use for cooking meatballs in a microwave oven. It will be understood that, while the invention is described in the context of meatballs, that the invention is equally useful in cooking other small food items such as dumplings, "porcupines", small sausages, fishballs, egg rolls or the like.

The invention comprises a drip pan (1) for catching the melted fat or other material given off by the material being cooked, having a plurality of vertical pegs (2) imbedded in the bottom of the pan (1). Each peg (2) is spaced evenly from each other as to keep the meatballs from sticking to each other. A spacing of about 1½–3", center to center (4–8 cm) would be appropriate. Each of the pegs (2) has a disc-like stop (3), which serves to support the meatballs and prevent them from sliding down the peg or falling apart.

Handles (4) are provided for ease of picking up the device.

FIG. 1 shows a square array of 16 (4×4) pegs (2) in an 8" (20 cm) square pan (1), but it will be understood that any number of pegs which will fit in the pan, in any convenient arrangement, could be used within the teachings of the invention.

All of the parts of the invention in this embodiment are preferably made of microwave-safe materials, such as glass or plastic. Preferably the material will be sufficiently heat-resistant that the meatball cooker could be used in a conventional oven or broiler as well, to cook or re-heat the meatballs. A material such as Pyrex® or the like would be ideal for the drip pan, as it would allow the cooker to go from the refrigerator to the microwave without danger of thermal damage. A less expensive microwave-only option for the drip pan, at least, would be simply a plastic such as polyethylene (LDPE or HDPE), since the temperatures in a microwave do not rise very high.

If the invention will be used only in conventional ovens or broilers, then metal would be an appropriate material, preferably coated in PTFE ("Teflon®") or other non-stick coating for easy cleaning.

Figure 2:
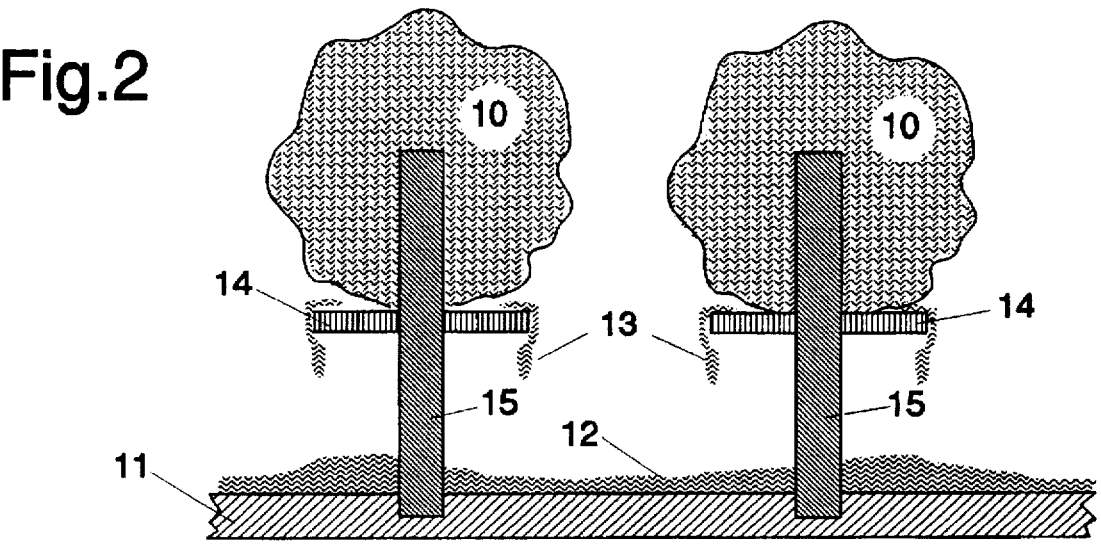
FIG. 2 shows a cut-away detail of the invention, showing a pair of pegs with meatballs thereon.

FIG. 2 shows a cut-away cross-section of the invention in use. The invention is used by making the meatballs (10), putting them on the pegs (15), sliding them down until they rest on the stops (14), and placing the invention in the microwave. The invention should be covered them with a paper towel to soak up any grease that pops from the meatballs, and to keep your microwave clean. The pegs (15) are preferably inset at their lower ends into the bottom of the drip pan (11), or they may (at some cost in strength) be adhesively applied to the surface of the bottom of the drip pan. If the drip pan is made of molded plastic, the pegs (15), stops (14) and drip pan (11) might be formed of one piece of material.

While the meatballs (10) are cooking, the fat in the meatballs liquefies and runs out of the meat. It drips (13) off the stops (14), and all the grease (12) goes to the bottom of the drip pan (11), cutting out a lot of the fat, and thus the cholesterol, from the meatballs. Since the stops (14) support the meatballs (10) well above the grease (12) in the drip pan (11), the meatballs (10) do not fall apart or absorb the grease from the pan. This makes the meatball more appetizing, healthier and easier to digest. After the meatballs (10) are done, you take a fork or tongs and lift them off the pegs (15) they are cooked on. The device in the microwave can be rotated for even cooking. The meatballs will all cook evenly and you won't have them sticking to the invention as they do to a skillet.

The pegs give support for the meatballs in place, allowing the microwaves or oven-heated air to surround the meatballs, thus there is no need to turn them over to brown them. By using this cooker in the microwave the juices are retained and cooked into the meat, giving it that flavor so essential to good beef. This I consider a good improvement as I have found that wherever the meat comes in contact with a hot skillet, it is deprived in a great measure of those rich juices, and often is burned and rendered not fit for the table.

Figure 3:
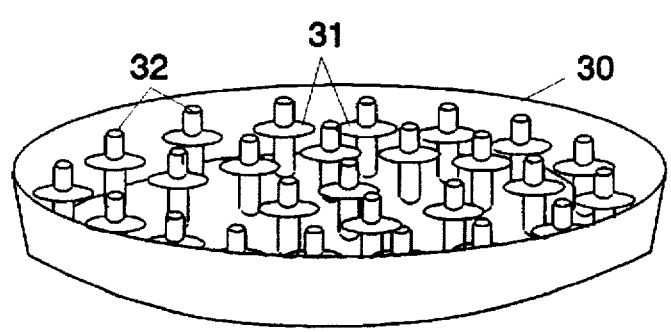
FIG. 3 shows an alternative stove-top embodiment of the invention.

FIG. 3 shows an alternative embodiment, which could be used for stove-top cooking of the meatballs. The stove-top embodiment the invention provides a unique cooking accessory which will elevate meatballs above a frying surface such as a skillet surface and eliminate charring, sticking, and preventing the meatballs from rolling around in grease and becoming saturated. In this embodiment, the drip pan (30) is made of stove-top safe material such as stainless steel, Pyrex® or (less desirably) aluminum, and can either be shaped and sized to fit in a conventional 12" (30 cm) frying pan, or could be provided with a lid and used directly on the heat. The pegs (32) and stops (31) would also need to be made of heat-resistant material such as stainless steel or glass. If the pegs (32) are made of heat-transmissive material such as metal, they will also serve to cook the meatballs from the inside as the outside is cooked by the heated air within the cooker or covered skillet.

The suspension of the meatballs above the fat in the pan eliminates the need to drain them first before putting them in the sauce. Also the device can be used to store meatballs in the refrigerator till to time for cooking, thus allowing a cook to prepare them ahead of time.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A meatball cooker comprising:

a) a horizontal drip pan, having a bottom and sides and an open top;

b) a plurality of pegs projecting upward from the bottom of the horizontal drip pan, the pegs being spaced apart a predetermined distance sufficient that meatballs of a predetermined size can be placed on adjacent pegs without touching;

c) each of the pegs having a stop means for preventing a meatball on the peg from sliding down the peg, located intermediate along the length of the peg above the bottom of the drip pan.

2. The meatball cooker of claim 1, in which the stop means are disks, the peg being inserted through the center of the disk along the axis thereof.

3. The meatball cooker of claim 1, in which the drip pan, pegs and stop means are made of microwave oven-safe material.

4. The meatball cooker of claim 3, in which the material is glass.

5. The meatball cooker of claim 3, in which the material is plastic.

6. The meatball cooker of claim 1, in which the drip pan is made of metal.

7. The meatball cooker of claim 6 in which the drip pan is coated in antistick coating.

8. The meatball cooker of claim 1, further comprising a plurality of handles affixed to the sides of the drip pan.

* * * * *